(12) United States Patent
Shoens et al.

(10) Patent No.: US 10,461,892 B2
(45) Date of Patent: Oct. 29, 2019

(54) LOW LATENCY COMMUNICATIONS

(71) Applicant: Oracle International Corporation, Redwood Shores, CA (US)

(72) Inventors: Kurt Alan Shoens, Los Altos, CA (US); Peter K. Craft, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 28 days.

(21) Appl. No.: 15/374,351

(22) Filed: Dec. 9, 2016

(65) Prior Publication Data

US 2018/0167168 A1 Jun. 14, 2018

(51) Int. Cl.
*H04L 1/08* (2006.01)
*H04L 12/26* (2006.01)
*H04L 29/06* (2006.01)
*H04L 12/801* (2013.01)

(52) U.S. Cl.
CPC ............ *H04L 1/08* (2013.01); *H04L 43/0829* (2013.01); *H04L 69/163* (2013.01); *H04L 47/34* (2013.01)

(58) Field of Classification Search
None
See application file for complete search history.

(56) References Cited

U.S. PATENT DOCUMENTS

| 8,819,512 B1 * | 8/2014 | Wang | H04L 1/08 714/748 |
| 2005/0018668 A1 * | 1/2005 | Cheriton | H04L 47/10 370/389 |
| 2005/0058149 A1 * | 3/2005 | Howe | H04L 47/10 370/428 |
| 2006/0067222 A1 * | 3/2006 | Endoh | H04L 69/16 370/231 |
| 2007/0133414 A1 * | 6/2007 | Krishna | H04L 69/16 370/235 |
| 2015/0019716 A1 * | 1/2015 | Kim | H04L 1/1809 709/224 |
| 2017/0171098 A1 * | 6/2017 | Le | H04L 47/40 |

OTHER PUBLICATIONS

N. Dukkipati et al., "Tail Loss Probe (TLP): An Algorithm for Fast Recovery of Tail Losses", TCP Maintenance Working Group, Google, Inc., Feb. 25, 2013.
Programmer's Guide, Release 2.0, Apr. 24, 2015.

* cited by examiner

*Primary Examiner* — Jutai Kao
(74) *Attorney, Agent, or Firm* — Potomac Law Group, PLLC

(57) ABSTRACT

Systems and methods for reducing communication latency are provided. A communication session with a remote device is initiated. One or more message packets are transmitted to the remote device. Subsequently, it is determined whether any additional message packet is scheduled to be transmitted to the remote device. In the event that no additional message packet is scheduled to be sent to the remote device, a loss detection packet is appended to a last message packet. The last message packet and the loss detection packet are transmitted to the remote device. It is further determined whether the last message packet was successfully received by the remote device based on receipt of an acknowledgment message. In the event that the last message packet was not successfully transmitted, a retransmit of the last message packet is executed.

20 Claims, 6 Drawing Sheets

500

600

LOW LATENCY COMMUNICATIONS

FIELD

The embodiments of the present invention are generally directed to a communications network, and more particularly, to the detection and retransmission of dropped data packets over the communications network.

BACKGROUND

Conventional packet-based networks were designed to support reliable data transfer over unreliable communication networks. Although such networks may achieve high performance at a reasonable cost, system designers and end-users alike expect some packets to be dropped occasionally. Although some recovery mechanisms exist for the retransmission of the dropped packets, lengthy delays still occur and application performance is impaired.

In some instances, the dropped packets may cause delays on the order of 250-300 ms. For latency critical operations, such as block access storage, a variety of solutions have been developed. However, such solutions have not been widely implemented due to their significant drawbacks. For example, specialized networks that rarely drop the data packets, such as data center Ethernet ("DCE"), InfiniBand, and others have been developed. However, such implementations currently have scale limitations, require specialized switches, and are otherwise expensive to implement. As a result, such specialized networks have not been widely deployed.

SUMMARY

The embodiments of the present invention are generally directed to systems and methods for reducing packet latency that substantially improve upon the known art communication networks.

Features and advantages of the embodiments are set forth in the description which follows, or will be apparent from the description, or may be learned by practice of the invention.

For example, systems and methods for reducing communication latency are provided. A communication session with a remote device is initiated. One or more message packets are transmitted to the remote device. Subsequently, it is determined whether an additional message packet is scheduled to be transmitted to the remote device. In the event that no additional message packet is scheduled to be sent to the remote device, two loss detection packets are appended to a last message packet. The last message packet and the loss detection packets are transmitted to the remote device. It is further determined whether the last message packet was successfully received by the remote device based on an acknowledgement message. In the event that the message packets were not successfully transmitted, a retransmit of the missing message packets is executed.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
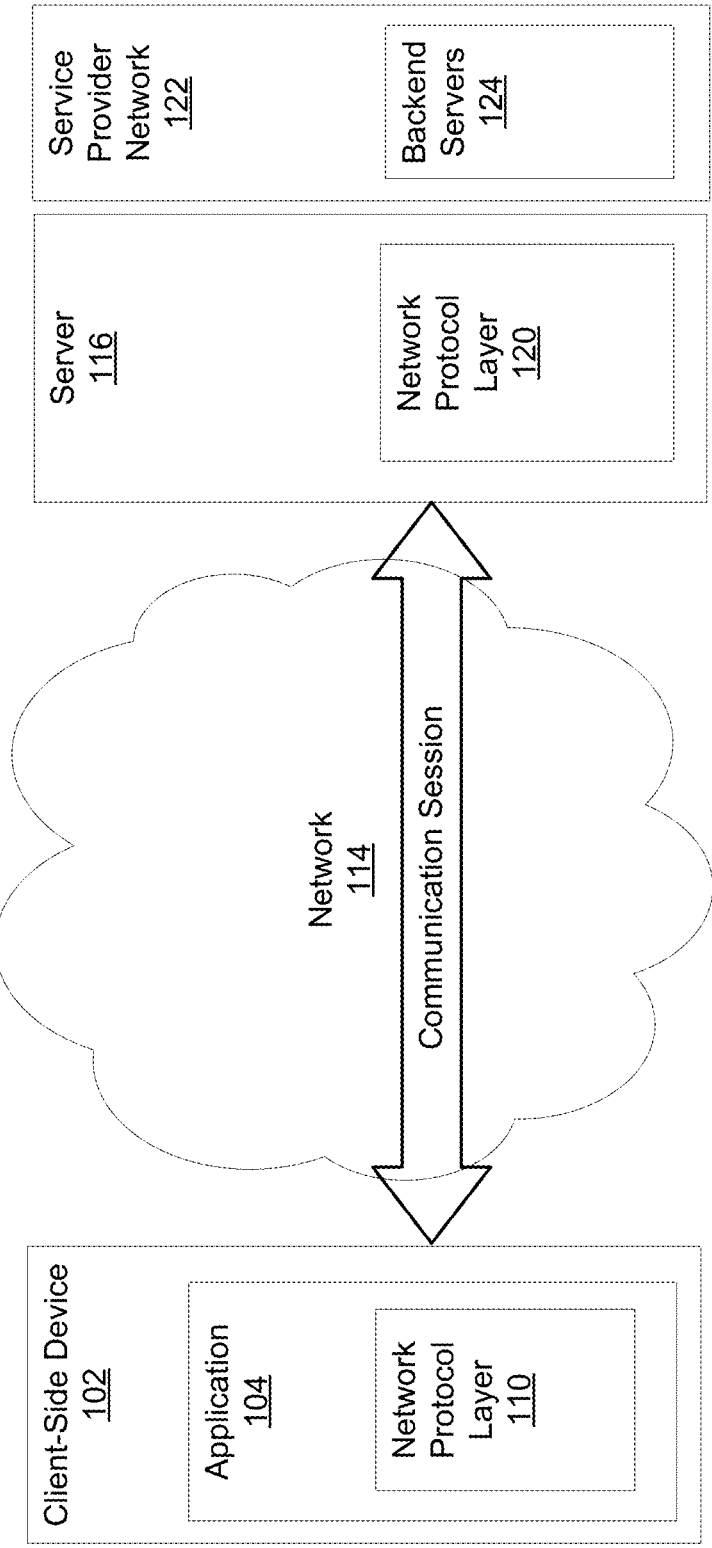
FIG. 1 is an overview diagram of a network system including network elements that implement embodiments of the present invention and/or interact with embodiments of the present invention.

Systems and methods for reducing communication latency are provided. Embodiments of the present invention append one or more loss detection packets to message packets (e.g., a session layer request or response) if no further message packets are scheduled to be transmitted in a communication session. The loss detection packets are used to identify the loss of time sensitive and/or other important packets quickly. If any of the loss detection packets is actually lost or dropped within the communication channel, it has little or no effect on the application as the loss detection packets are typically decoy packets that carry no latency-critical application data. However, if the network drops the last or the second to last data packet in the communication session flow, reception of the loss detection packets triggers a retransmit procedure of the applicable communication protocol being used in the communication network.

In the various embodiments, a communication session with a remote device is initiated. One or more message packets are transmitted to the remote device. Subsequently, it is determined whether any additional message packet is scheduled to be transmitted to the remote device. In the event that no additional message packet is scheduled to be sent to the remote device, a loss detection packet is appended to a last message packet. The last message packet and the loss detection packet are transmitted to the remote device. It is further determined whether the last message packet was successfully received by the remote device based on reception of an acknowledgment message. In the event that the last detection packet was not successfully received, a retransmit of the last message packet is executed. Accordingly, the example embodiments may more readily detect lost message packets, and thereby improve the throughput of the communications network.

The embodiments of the present invention provide systems and methods that reduce communication latency while using existing and widely-implemented communication networks. Another technique called tail loss probe ("TLP") has also been proposed. In TLP, the sender sets a timeout for acknowledgment from the receiver. If the sender does not receive the acknowledgment within a predetermined time, the sender resends the first unacknowledged packet. TLP has the advantage that only the sender makes any changes, but has the disadvantage that the sender cannot set its timer for a short duration. It must be set to at least twice the duration of the smoothed round-trip time of the connection to account for delayed acknowledgments. In addition, setting and testing short deadline timers is expensive. Finally, TLP is sensitive to the delayed acknowledgment algorithm used by the recipient. By contrast, the embodiments of the present invention recover from packet loss significantly more quickly, without the overhead of setting and canceling timers, and without any requirements on the receiver's delayed acknowledgement algorithm.

In the various embodiments, the term "message packet" is used, and may be understood by one of ordinary skill to include request packets, response packets, and any packet data exchanged between communications equipment on a network. For example, message packets may include protocol data units ("PDUs") or session layer PDUs. Within layered systems, message packets may include information exchanged between entities of a given layer, via the service provided by the next lower layer, to coordinate their joint operation. In another example, message packets may denote session layer messages as well as transmission control protocol segments.

FIG. 1 is an overview diagram of a network system 100 including network elements that implement embodiments of the present invention and/or interact with embodiments of the present invention.

Network system 100 includes a client device 102 that is configured to exchange packet data with a server 116 using one or more communication protocols, a network 114, and a service provider network 122. Within client device 102, the packet data may be generated by one or more applications 104. Example applications include block access storage, audio and/or video streaming, audio and/or video telephony, application streaming, and the like. In addition, the packet data may be encoded, decoded, or otherwise configured using one or more network protocol layers 110 that provide communication functionality according to a variety of communication protocols, for example.

Server 116 is configured to exchange the packet data with client device 102. For example, server 116 may be configured to respond to requests of client device 102. In addition, client device 102 may communicate the packet data with respective backend servers 124 in service provider network 122 via server 116. Backend servers 124 may include a variety of servers used for data storage, block access storage, cloud computing, and the like. At the server side, the packet data may be encoded, decoded, or otherwise configured using one or more network protocol layers 120 that provide communication functionality according to a variety of communication protocols, for example.

Each of client device 102 and server 116 may be any electronic device used for communications, such as a smartphone, a tablet, a laptop computer, a server, a television, and the like. Different types of packet data ranging from pure data to real-time media may traverse network system 100. In general, some data may be sensitive to throughput while other data, such as real-time media, may be sensitive to latency. Within the transmission control protocol ("TCP") and the Internet protocol ("IP"), commonly referred to as TCP/IP, as long as client device 102 continues to produce requests, server 116 may detect lost packets quickly. For example, using the TCP/IP fast retransmit algorithm, server 116 detects the loss of a packet and acknowledges the last received sequence number to client device 102. If client device 102 receives multiple (e.g., three) acknowledgements of the same sequence number, client device 102 retransmits the missing packets. If the client device 102 pauses in the sending of requests, the loss of the last or second to last packet in the session flow prevents server 116 from receiving the complete request until the TCP/IP retransmit timer expires, typically in hundreds of milliseconds (e.g., 300 ms). The retransmit timer is typically set to have such a long duration because it should be longer than the delay acknowledgement timer (e.g., 150 ms). As a result, occasional latencies several orders of magnitude (e.g., thousands of times) higher than the usual latency frequently occur.

Network 114, service provider network 122, and other components of network system 100 may utilize a variety of communication protocols, including Internet, Ethernet, wide area networks ("WAN"), fabrics in a storage system, wired and wireless protocols, and other known or expected network systems. In addition, the embodiments enable the use of conventional networks, such as Ethernet networks, for latency critical applications. The communication protocols may include TCP/IP. Internet RFC 793, which is incorporated herein by reference, generally describes TCP/IP functionality, and Internet RFC 5681, which is also incorporated herein by reference, generally describes TCP Congestion Control. Although the embodiments of the invention are generally described in connection with TCP/IP, the invention is not so limited, but rather may be applied to a variety of network types.

As an alternative to a direct implementation within TCP/IP, other implementations that incorporate TCP/IP may be used. For example, a remote direct memory access ("RDMA") implementation may be layered on TCP/IP, such as Internet wide area RDMA protocol ("iWARP"). RFC 5040, which is incorporated herein by reference, generally describes RDMA functionality. Without implementing the embodiments of the present invention, iWARP requests may occasionally produce latencies thousands of times larger than normal due to lost packets. Thus, the embodiments may be applied to iWARP to provide more reliable communication and consistently improve communication latency.

Alternatively, the Internet small computer system interface ("iSCSI") may be used. RFC 3720, which is incorporated herein by reference, generally describes iSCSI functionality. For iSCSI, the loss detection packets may be appended as a TCP/IP session option as long as the iSCSI implementation asserts a push acknowledgement ("PSH") at the end of each request and response. In addition, nonvolatile memory ("NVMe") over fabrics may be used. The NVMe storage protocol may be executed over RDMA fabrics such as InfiniBand, RDMA over converged Ethernet ("RoCE"), and iWARP.

In yet another alternative, the network file system ("NFS") protocol may be implemented over TCP/IP. In NFS embodiments, an NFS-based client device may insert one or more NULL protocol requests, and the NFS-based server may insert one or more NULL protocol responses to generate loss detection packets. As a result, the loss detection packets prevent the NFS-based client from experiencing very long delays due to TCP retransmit timer expiration due to the loss of data packets.

Most Ethernet network interface controllers ("NICs") and TCP offload engines ("TOEs") implement a set of stateless offloads. For example, typical offloads include checksum offload, segmentation offload, receive side scaling, and receive side coalescing ("RSC") also called large receive offload ("LRO"). Also, Linux utilizes a software implementation called generalized receive offload ("GRO"). The embodiments of the present invention may be implemented in conjunction with any of these offload mechanisms. For example, RSC merges packets before the receiving TCP/IP stack receives them. If the RSC merges the two loss detection packets or the last packet of the flow with the loss detection packets, the receiving side will not send a sufficient number of duplicate ACK packets to trigger fast retransmit. To overcome this problem, interoperation of the loss detection packets with the RSC requires setting the PSH bit on the last packet of the flow and the two loss detection packets.

For implementations above the TCP/IP level, the embodiments may control or modify the session's packet structure to ensure that the TCP implementation generates multiple loss detection packets when needed. Conventional TCP/IP socket application program interfaces ("APIs") do not provide control over the division of an application flow across packets. However, the embodiments may be applied within either kernel space applications that can exert control over packet divisions, in user-space applications using a specialized TCP/IP implementation such as the Intel data plane development kit ("DPDK"), or on specialized NICs implementing high level protocols such as iWARP or iSCSI. Each of these network environments offers sufficient control over placement of data in packets to generate loss detection packets.

Irrespective of the communication protocol being used, small loss detection packets may be appended to requests in some embodiments, each encoded in a single separate packet, when no additional requests are scheduled. If network 114 drops the data packets that include the loss detection packets, a retransmit procedure is triggered (e.g., TCP/IP fast retransmit). RFC 6298, which is incorporated herein by reference, generally describes the retransmit timeout procedures. In such implementations, loss detection packets may be discarded. Alternatively, loss detection packets may be used to transmit non-critical and/or other data that is not time-sensitive. If the loss detection packets are used transmit packet data, the loss detection packets are not readily discarded.

Figure 2:
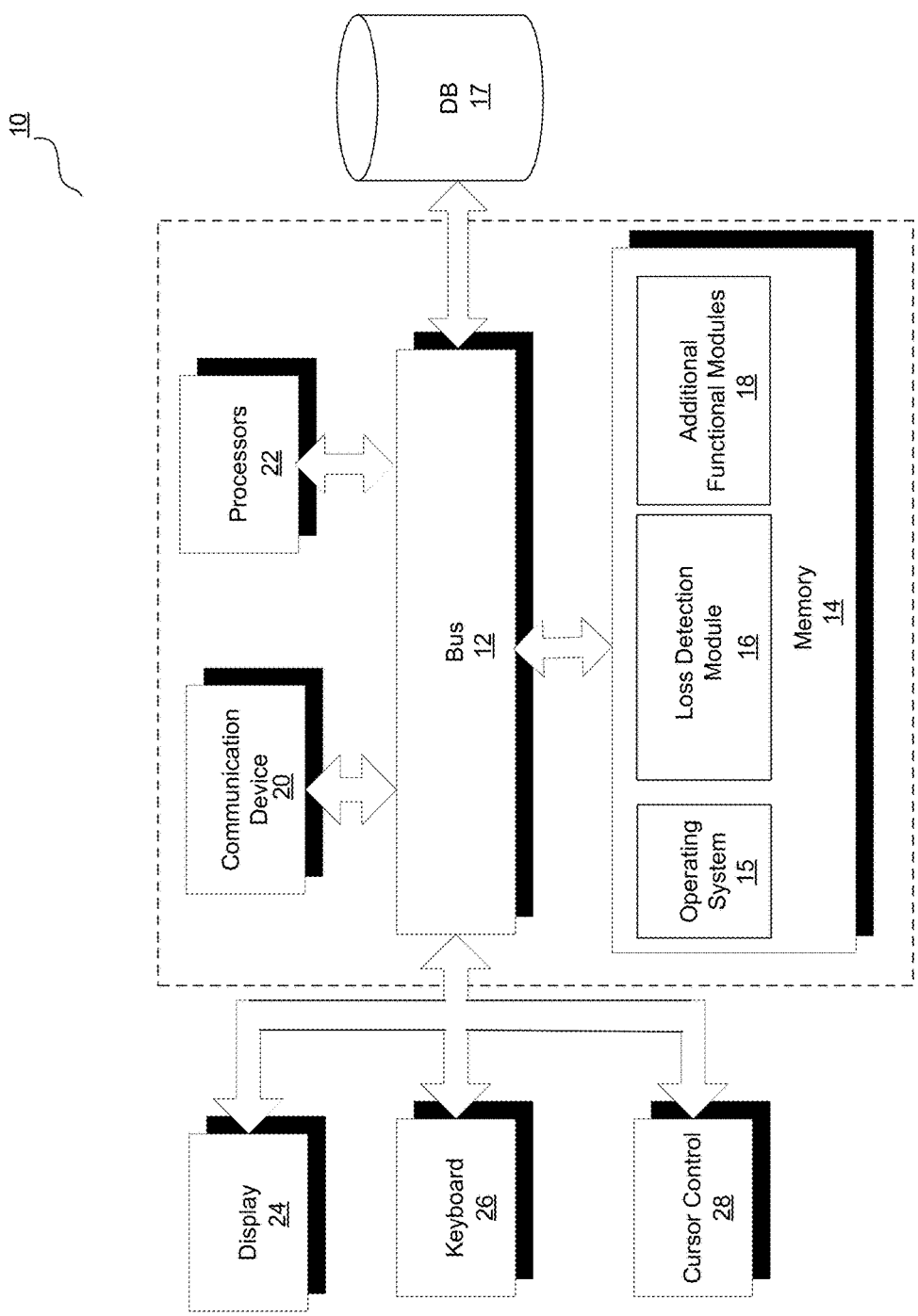
FIG. 2 is a block diagram of a computer server/system according to an example embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Additionally, one or more components of system 10 may not be included and alternate configurations may be used. For example, for the functionality of server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of non-transitory or computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a loss detection module 16 for providing decoy or loss detection packets, and all other functionality disclosed herein. In one example embodiment, loss detection module 16 may implement server 116 of FIG. 1 in conjunction with one or more remaining elements of FIG. 2. System 10 can be part of a larger system, such as added functionality to the "Flash Storage System" from Oracle Corp. Therefore, system 10 can include one or more additional functional modules 18 to include the additional functionality. A database 17 is coupled to bus 12 to provide centralized storage for loss detection module 16 and additional functional modules 18.

In one embodiment, loss detection module 16 and/or additional functional modules 18 may include an establishing module that establishes a communication session between the client device and the server using one or more loss detection packets. For example, loss detection module 16 may be configured to append one or more loss detection packets to message packets if no further message packets are scheduled to be transmitted in a communication session. The loss detection packets are used to identify the loss of time sensitive and/or other important message packets more quickly. The loss detection packet is used to trigger a retransmit procedure of the applicable communication protocol being used in the communication network.

Figure 3:
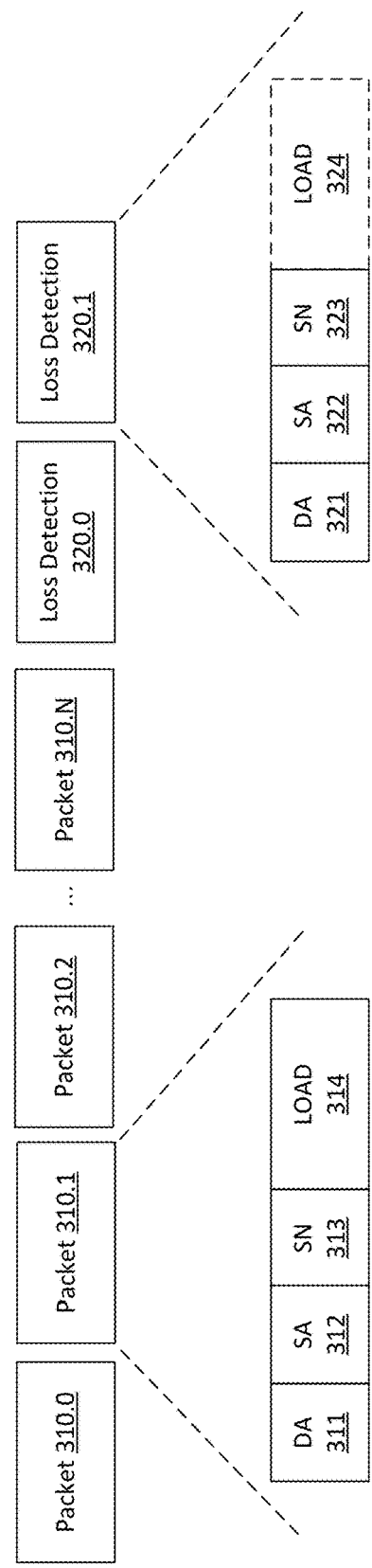
FIG. 3 illustrates an example packet stream according to an example embodiment of the present invention.

FIG. 3 illustrates an example packet stream according to an example embodiment of the present invention.

As shown in FIG. 3, data packet stream 300 includes message packets 310.0-310.N and loss detection packets 320.1 and 320.2. Each packet may include a destination address 311, 321, source address 312, 322, sequence number 313, 323, and data load 314, 324. For the loss detection packets 320.1 and 320.2, inclusion of data load 324 is optional. For example, loss detection packets 320.1 and 320.2 may be used to transmit non-critical and/or other data that is not time-sensitive. Alternatively, loss detection packets 320.1 and 320.2 may be simplified decoy packets that are used solely to determine whether message packets 310.0-310.N have been dropped.

Depending of the communication protocol being used, the client and server side devices of the communication session negotiate the format of the loss detection packets. In TCP/IP, for example, when the TCP/IP client transmits data packets with the PSH flag set, the TCP/IP communication protocol may append multiple (e.g., two) additional one-byte loss detection packets that the receiving server silently discards. The use of two loss detection packets may be preferred to ensure that a sufficient number of acknowledgment messages are received to trigger fast retransmit. The use of two or more loss detection packets does not hinder network performance due to their small size. In such implementations, each of the loss prevention packets contains one byte in order to advance the TCP/IP sequence number and engage the packet loss retransmit algorithms. In TCP/IP, sequence number 313, 323 is calculated as the last sequence number added to the length of the last packet.

Although the embodiments introduce the use of additional loss detection packets 320.0 and 320.1, their use has negligible impact on network performance. Modern Ethernet NICs and TOEs easily handle millions of packets per second. Thus, the Ethernet NICs or TOEs may easily handle the additional loss detection packets without impairing data transmission rates.

Figure 4:
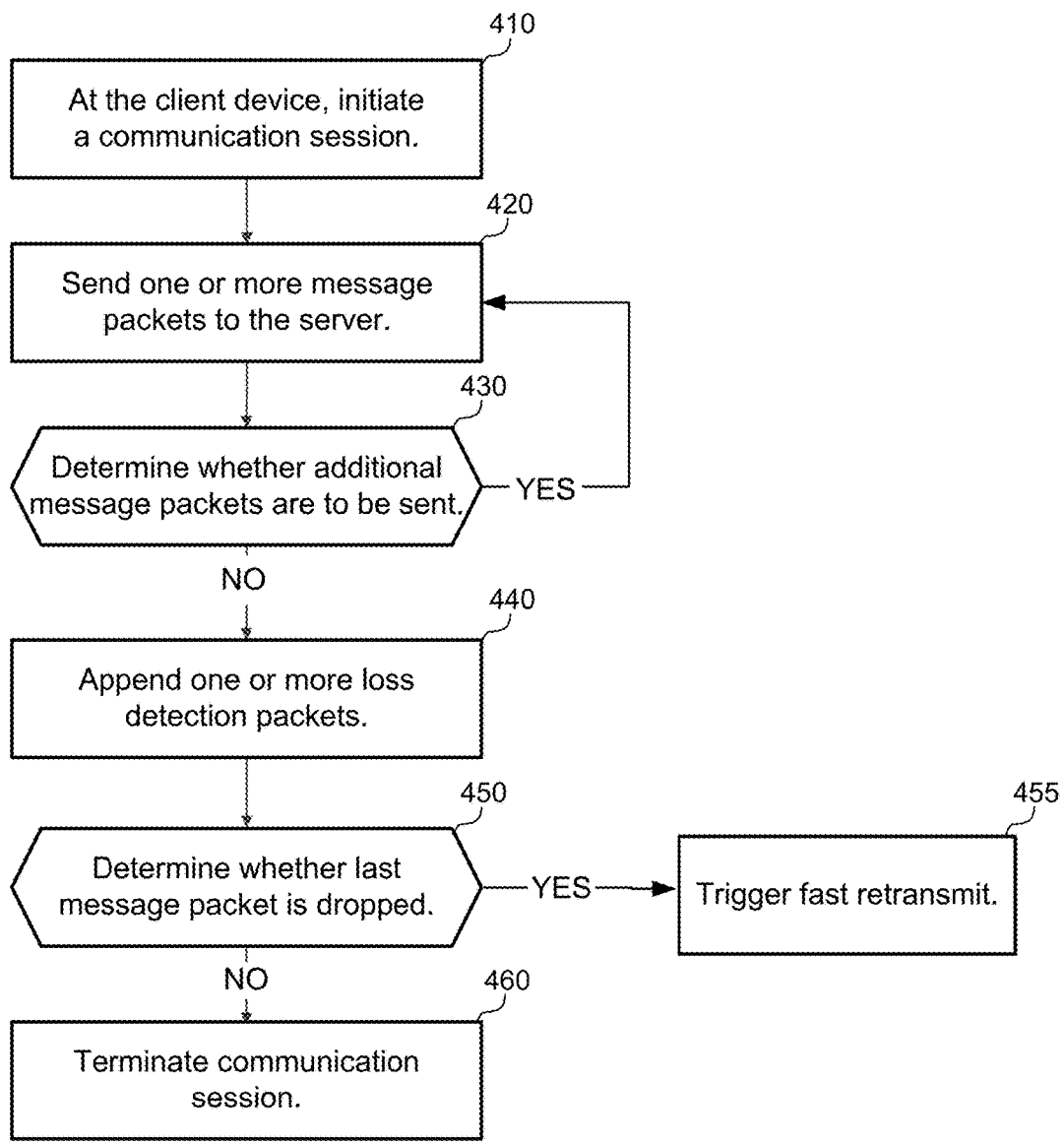
FIG. 4 illustrates a flow diagram for reducing communication latency according to an example embodiment of the present invention.

FIG. 4 illustrates a flow diagram of functionality 400 for reducing communication latency according to an example embodiment of the present invention. In some instances, the functionality of the flow diagram of FIG. 4 is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

At 410, functionality 400 initiates a communication session between the client device and the remote device. The embodiments of the invention may be used in conjunction with a variety of communication protocols. Such communication protocols may include TCP/IP, RDMA, iSCSI, NVMe over fabrics, RDMA over fabrics such as InfiniBand, RoCE, and iWARP, and other communication protocols.

Once the communication session has been established, functionality 400 transmits one or more message packets from the client device to the remote device. Request and response data packets exchanged between the client device and the remote device may be part of a variety of applications, such as block access storage, audio and/or video streaming, audio and/or video telephony, application streaming, and any other response/request type application.

Subsequently, functionality 400 (e.g., loss detection module 16 of FIG. 2) determines whether any additional message packet is scheduled to be transmitted to the remote device, at 430. In the event that one or more additional message packets is scheduled to be transmitted to the remote device, functionality 400 returns to 420 for the transmission of the message packets from the client device to the remote device. Otherwise, in the event that no additional message packet is scheduled to be transmitted to the remote device, one or more loss detection packets are appended to the last message packet, at 440. Here, the last message packet and the loss detection packets are transmitted to the remote device.

At 450, functionality 400 further determines whether the last message packet was successfully received by the remote device. Functionality 400 may determine if the loss detection packets were successfully received based on acknowledgment messages. In the event that the loss detection packet was not successfully received, the retransmit of the last message packet and loss detection packet is executed, at 455. For example, if the client device receives multiple (e.g., three) acknowledgements of the same sequence number, the client device retransmits the message packets that are deemed missing. The last message packet may be retransmitted within 100 microseconds or less of its previous transmission. For example, the retransmit procedure may include TCP/IP fast retransmit. Otherwise, in the event that the loss detection packet was successfully transmitted, functionality 460 terminates the communication session, at 460.

Figure 5:
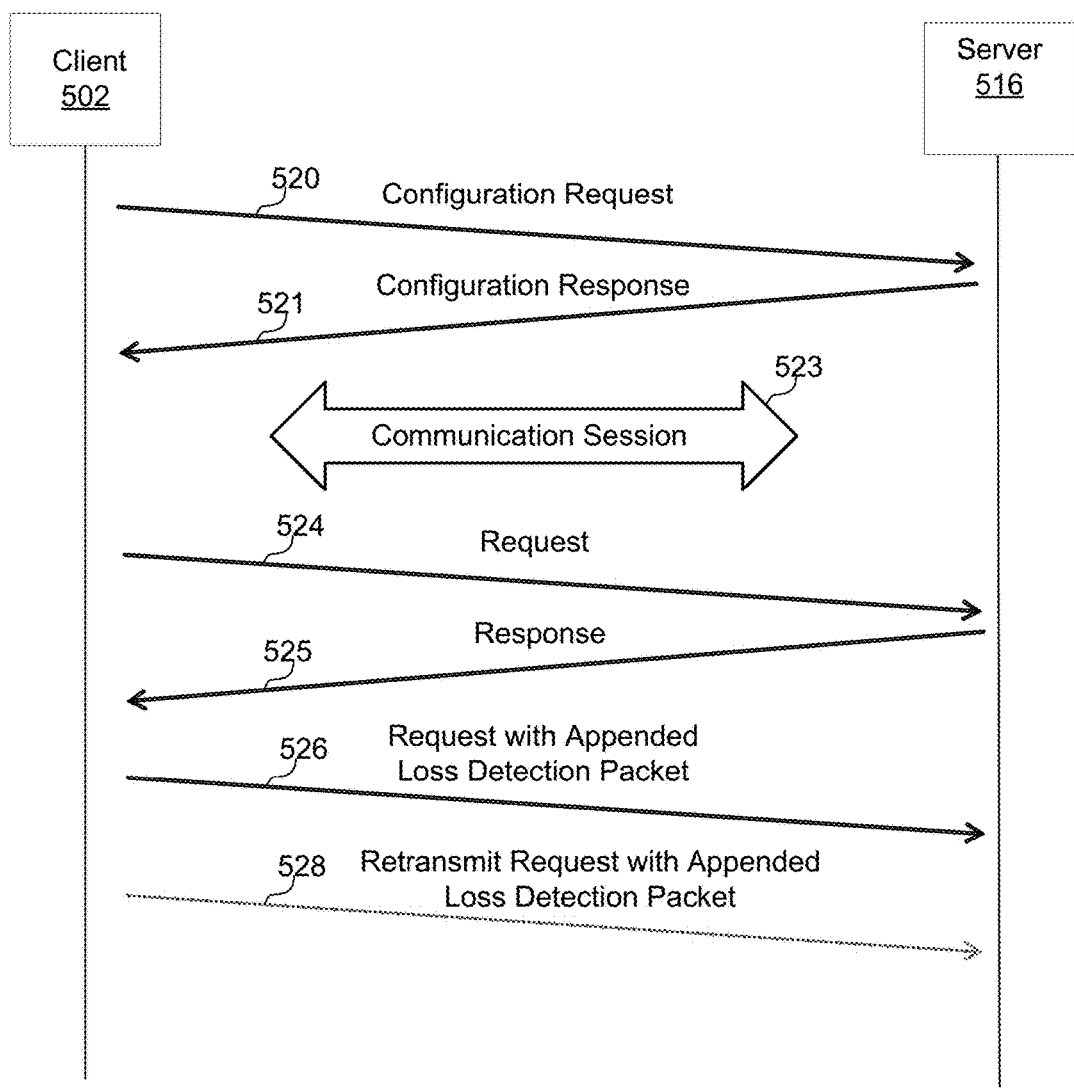
FIG. 5 is a packet sequence diagram including an example sequence of request and response packets exchanged between the client and server, according to an example embodiment.

FIG. 5 is a packet sequence diagram 500 including an example sequence of request and response packets exchanged between client device 502 and server 516, according to an example embodiment. FIG. 5 includes network elements such as client device 502 and server 516, as described herein with reference to FIG. 1 (client device 102 and server 116 in FIG. 1).

At 510, client device 502 transmits one or more configuration request packets 520 (e.g., a message packet) to server 516. In turn, server 516 responds to the configuration request packets 520 with one or more configuration response messages 521. Configuration request packets 520 and configuration response packets 521 enable client 502 and server 516 to establish a communication session 523. The embodiments of the invention may be used in conjunction with a variety of communication protocols, such as TCP/IP, RDMA, iSCSI, NVMe over fabrics, RDMA over fabrics such as InfiniBand, RoCE, and iWARP, and other communication protocols.

Once communication session 523 has been established, client device 502 transmits one or more request packets 524 to server 516. In turn, server 516 responds to request packets 524 with one or more response messages 525. Request packets 524 and response messages 525 may be part of a variety of applications, such as block access storage, audio and/or video streaming, audio and/or video telephony, application streaming, and any other response/request application.

Subsequently, loss detection modules of client device 502 determine whether any additional request packet is scheduled to be transmitted to the remote device. If no additional request packet is scheduled, one or more loss detection packets are appended to the last request packet 526. Here, the last request packet and the loss detection packets 256 are transmitted to server 516.

Lastly, loss detection modules of client device 502 further determine whether the loss detection packet 526 was successfully received by server 516. For example, client device 502 determines if loss detection packet 526 was not successfully received when multiple (e.g., three) acknowledgements of the same sequence number are received. In the event that loss detection packet 526 was not successfully received, the last request packet and appended loss detection packet are retransmitted, at 528. Here, the TCP/IP fast retransmit algorithms may be used, for example.

Figure 6:
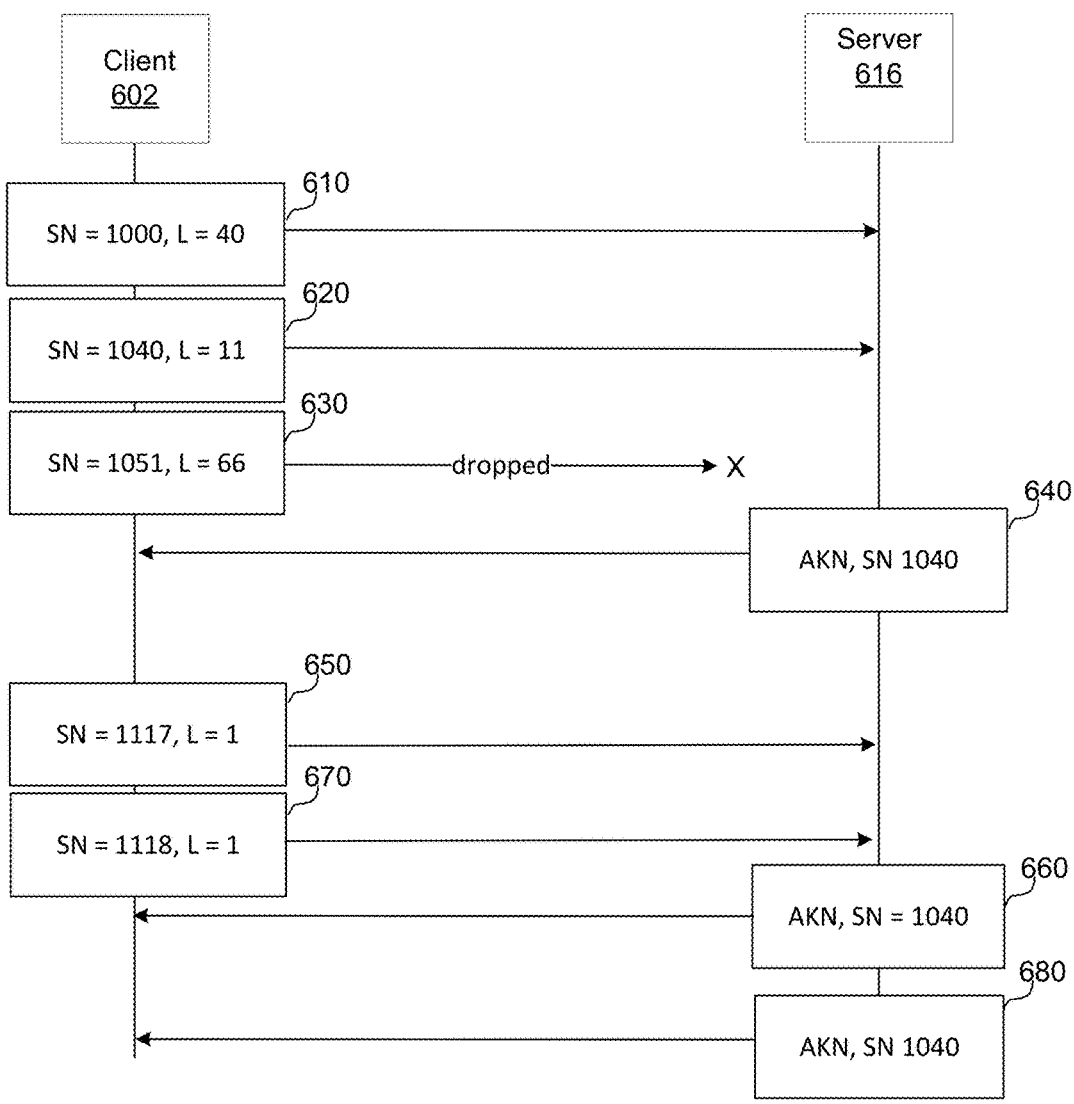
FIG. 6 is a packet sequence diagram including an example sequence of message packets exchanged between the client and server, according to an example embodiment.

FIG. 6 is a packet sequence diagram 600 including an example sequence of message packets exchanged between client device 602 and server 616, according to an example embodiment. FIG. 6 includes network elements such as client device 602 and server 616, as described herein with reference to FIG. 1 (client device 102 and server 116 in FIG. 1).

Each message packet 610, 620, 630 may include fields for the sequence number ("SN" in FIG. 6) and the length ("L" in FIG. 6), such as the number of bytes. Acknowledgement messages 640, 660, 680 also include the sequence number of the message packet being acknowledged or the last message packet received by server 616. In addition, each loss detection packet 650, 670 may include fields for the sequence number and the length (e.g., one byte). Although not shown in FIG. 6, each of the various message packet types also include fields for the source address, destination address, and other fields as described above in FIG. 3.

Client device 602 may transmit message packets 610, 620, 630 to server 616. Client device 602 also transmits loss detection packets 650, 670. In turn, server 616 responds to message packets 610, 620, 630 with one or more acknowledgment messages 640, 650, 660. Here, in this particular example, message packet 630 is dropped during transmission to server 616. As a result, client 602 receives multiple acknowledgements of message packet 620. Client device 602 determines if a message packet (e.g., message packet 620) was not successfully received when multiple (e.g., three) acknowledgements of the same sequence number are received. Receipt of a third duplicate acknowledgement message causes fast retransmission of message packets having a sequence number after 1040, including message packet 630.

In example packet sequence 600, after receiving message packets 610, 620, server 616 acknowledges them with acknowledgement packet 640, indicating that server 616 has received up to sequence number 1040. Server 616 never receives messages packet 630. Upon receiving loss detection packet 650 with sequence number 1117, server 616 sends a duplicate acknowledgement packet 660, again indicating that it has only received data up to sequence number 1040. Client device 602 sends loss detection packet 670. Upon receiving loss detection packet 670, server 616 sends another duplicate acknowledgement packet 680 for sequence number 1040. Client device 602 has now received three acknowledgements for sequence number 1040, and responds by retransmitting the missing packet message(s) and/or loss detection packets after sequence number 1040. By applying the embodiments of the present invention, client device 602 conveys message packets 610, 620, 630 to server 616 with minimal delay, despite the loss of message packet 630.

The various embodiments described herein may be implemented using a combination of hardware and software. For example, the embodiments may be implemented using a C language application that generates one or more messages from the client device to the server over a TCP socket. In this example, the C language application sets the TCP_NODE-LAY parameter to disable the standard Nagle algorithm that groups small transfers into a packet. The C language application generates a message from the client device to the server and waits for a one-byte response. Optionally, the client device may generate two dummy one-byte packets. Example pseudocode for transmitting the loss detection packets is as follows:

while (PDUs are left to send) then
transmit packets of next PDU;
transmit two loss detection packets;
if (receive acknowledgment packets that indicate lost packets) then retransmit missing packets;

As described herein, systems and methods for reducing communication latency are provided. Embodiments of the present invention append one or more loss detection packets to message packets if no further message packets are scheduled to be transmitted in a communication session. The loss detection packets are used to more quickly identify the loss of time sensitive and/or other important packets. If any of the loss detection packets is actually lost or dropped within the communication channel, it has little or no effect on the application as the loss detection packets are typically decoy packets. However, if the network drops the last or the second to last data packet in the communication session flow, the loss detection packets are used to trigger a retransmit (e.g. within 100 microseconds or less) procedure of the applicable communication protocol being used in the communication network.

It will be apparent to those skilled in the art that various modifications and variations can be made in the addition of loss detection packets of the present disclosure without departing from the spirit or scope of the disclosure. Thus, it is intended that the present disclosure cover the modifications and variations of this disclosure provided they come within the scope of the appended claims and their equivalents.

What is claimed is:

1. A method, comprising:
   initiating a communication session with a remote device;
   transmitting a plurality of message packets to the remote device;
   determining whether any additional message packet is scheduled to be transmitted to the remote device;
   appending, based on the determining, two or more loss detection packets to a last message packet and transmitting the last message packet and the loss detection packets to the remote device, wherein the lost detection packets comprise transmission control protocol/internet protocol (TCP/IP) layer lost detection packets;
   determining whether the last message packet was successfully received by the remote device based on receiving one or more acknowledgment messages; and
   executing a retransmit of the last message packet when the last message packet was not successfully received, wherein it is determined that the last message packet was not successfully received when at least three acknowledgment messages that identify a message immediately previous to the last message packet are received.

2. The method according to claim 1, wherein the retransmit is executed using TCP/IP fast retransmit based on the received at least three acknowledgment messages that identify the message immediately previous to the last message and the last message packet is retransmitted within approximately 100 ms of its previous transmission.

3. The method according to claim 1, wherein the communication session utilizes one of the following communication protocols: TCP/IP, RDMA, iSCSI, NVMe over fabrics, RDMA over fabrics, InfiniBand, RoCE, or iWARP.

4. The method according to claim 1, wherein the at least three acknowledgment messages identify the message immediately previous to the last message packet based on packet sequence numbers.

5. The method according to claim 1, wherein the loss detection packets comprise one-byte packets.

6. The method according to claim 1, wherein the transmitted last message packet is dropped such that the remote device fails to successfully receive the last message packet.

7. The method according to claim 6, wherein the at least three acknowledgment messages that identify the message immediately previous to the last message packet indicate that the transmitted last message packet was dropped.

8. The method according to claim 1, wherein
   the transmitted message packets, loss detection packets, and received acknowledgment messages are communicated over a TCP socket, and
   the determining whether any additional message packet is scheduled to be transmitted to the remote device comprises determining whether any additional protocol data unit (PDU) is scheduled to be transmitted to the remote device.

9. The method according to claim 1, wherein the two or more loss detection packets are not appended to message packets of the transmission previous to the last message packet.

10. A non-transitory computer readable storage medium storing one or more programs configured to be executed by a processor, the one or more programs comprising instructions for:
    initiating a communication session with a remote device;

transmitting a plurality of message packets to the remote device;
determining whether any additional message packet is scheduled to be transmitted to the remote device;
appending, based on the determining, two or more loss detection packets to a last message packet and transmitting the last message packet and the loss detection packets to the remote device, wherein the lost detection packets comprise transmission control protocol/internet protocol (TCP/IP) layer lost detection packets;
determining whether the last message packet was successfully received by the remote device based on receiving one or more acknowledgment messages; and
executing a retransmit of the last message packet when the last message packet was not successfully received, wherein it is determined that the last message packet was not successfully received when at least three acknowledgment messages identify a message immediately previous to the last message packet are received.

11. The non-transitory computer readable storage medium according to claim 10, wherein the retransmit is executed using TCP/IP fast retransmit based on the received at least three acknowledgment messages that identify the message immediately previous to the last message, and the last message packet is retransmitted within approximately 100 ms of its previous transmission.

12. The non-transitory computer readable storage medium according to claim 10, wherein the communication session utilizes one of the following communication protocols: TCP/IP, RDMA, iSCSI, NVMe over fabrics, RDMA over fabrics, InfiniBand, RoCE, or iWARP.

13. The non-transitory computer readable storage medium according to claim 10, wherein the at least three acknowledgment messages identify the message immediately previous to the last message packet based on packet sequence numbers.

14. The non-transitory computer readable storage medium according to claim 10, wherein the loss detection packets comprise one-byte packets.

15. A system, comprising:
a processor; and
a memory storing one or more programs for execution by the processor, the one or more programs including instructions for:
initiating a communication session with a remote device;
transmitting a plurality of message packets to the remote device;
determining whether any additional message packet is scheduled to be transmitted to the remote device;
appending, based on the determining, two or more loss detection packets to a last message packet and transmitting the last message packet and the loss detection packets to the remote device, wherein the lost detection packets comprise transmission control protocol/internet protocol (TCP/IP) layer lost detection packets;
determining whether the last message packet was successfully received by the remote device based on receiving one or more acknowledgment messages; and
executing a retransmit of the last message packet when the last message packet was not successfully received, wherein it is determined that the last message packet was not successfully received when at least three acknowledgment messages that identify a message immediately previous to the last message packet are received.

16. The system according to claim 15, wherein the retransmit is executed using TCP/IP fast retransmit based on the received at least three acknowledgment messages that identify the message immediately previous to the last message.

17. The system according to claim 16, wherein the last message packet is retransmitted within approximately 100 ms of its previous transmission.

18. The system according to claim 15, wherein,
the transmitted last message packet is dropped such that the remote device fails to successfully receive the last message packet, and
the at least three acknowledgment messages that identify the message immediately previous to the last message packet indicate that the transmitted last message packet was dropped.

19. The non-transitory computer readable storage medium according to claim 10, wherein the transmitted last message packet is dropped such that the remote device fails to successfully receive the last message packet.

20. The non-transitory computer readable storage medium according to claim 19, wherein the at least three acknowledgment messages that identify the message immediately previous to the last message packet indicate that the transmitted last message packet was dropped.

* * * * *